July 2, 1968  C. L. NICHOLSON  3,390,937
ELECTRIC MOTOR ACTUATED REAR VIEW MIRROR ASSEMBLY
Filed Feb. 4, 1965
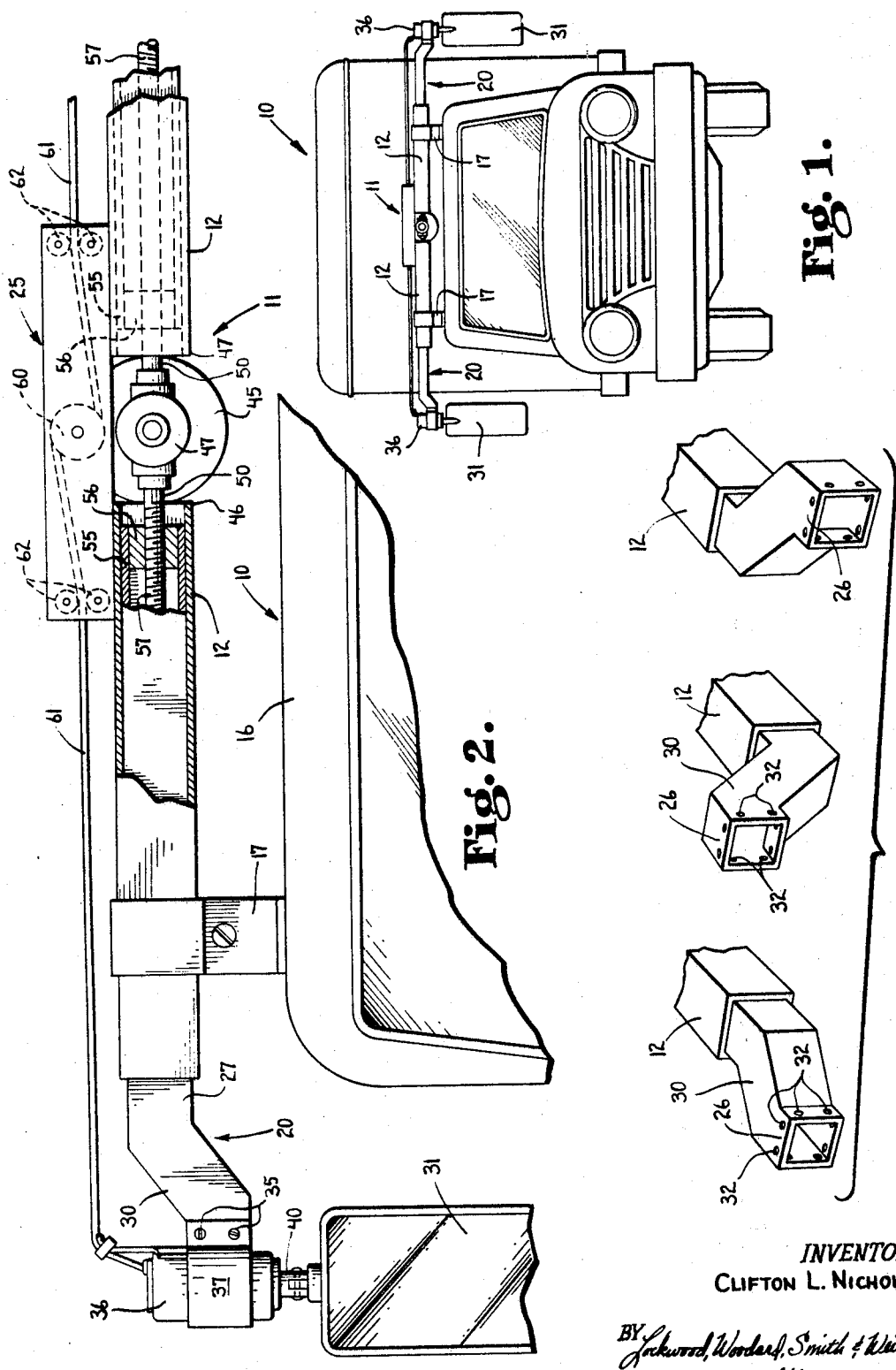
INVENTOR.
CLIFTON L. NICHOLSON
BY Lockwood, Woodard, Smith & Weikart
Attorneys United States Patent Office 3,390,937
Patented July 2, 1968

3,390,937
ELECTRIC MOTOR ACTUATED REAR
VIEW MIRROR ASSEMBLY
Clifton L. Nicholson, R.R. 4,
Scottsburg, Ind. 47170
Filed Feb. 4, 1965, Ser. No. 430,385
5 Claims. (Cl. 350—289)

The present invention relates to a rear view mirror arrangement.

There are various situations in which the standard factory equiment rear view mirror of a vehicle is not entirely satisfactory for safe driving. For example, a tractor may be used to pull a semitrailer which is of relatively great width and which carries a load such that there is no opening through the trailer for proper use of a cab-interior-mounted rear view mirror. Cab-exterior-mounted rear view mirrors are in common use but are not entirely satisfactory because in most cases they are not adjustable from the inside of the cab. In certain situations it is desirable that the cab-exterior-mounted rear view mirrors of a truck be positioned a substantial distance from the cab so that as good a rear view as possible can be obtained. One example of such a situation might be a fully loaded truck of any type being driven on a winding hilly type of road. In other applications it is desirable that the cab-exterior-mounted rear view mirrors of a truck be positioned as closely as possible to the cab of the truck, for example, when the truck is parked next to other relatively close vehicles.

Consequently one object of the present invention is to provide an improved rear view mirror arrangement for a vehicle such as a truck, automobile or the like.

Another object of the invention is to provide a rear view mirror arrangement which is easily adjustable from the interior of the cab of the vehicle for various driving and parking situations.

Still another object of the invention is to provide a rear view mirror arrangement which is adjustable to various positions and angles without obtaining different parts for the arrangement.

Related objects and advantages will become apparent as the description proceeds.

One specific embodiment of the present invention might include a rear view mirror arrangement for a truck or the like comprising a pair of tubular members of rectangular cross section adapted to be fixed to the top of the truck in laterally extending relation thereto; a reel mounting element fixedly securing said rectangular tubular members in aligned relation; a pair of elongated members of rectangular cross section; each of said elongated members being telescoped within a respective one of said tubular members; said elongated members having distal ends projecting away from one another out of said tubular members; said distal ends being offset laterally and downwardly from the proximal portion of said elongated members whereby said elongated members can be removed from said tubular members and reinserted therein with the distal ends offset rearwardly, forwardly or upwardly; a reversible electrical motor mounted on said reel mounting element; a pair of screws each threadedly received in a respective one of said elongated members; transmission means operatively connecting said reversible motor and said screws for simultaneous movement of said elongated members laterally of said truck; the threads of said screws being so arranged and the screws being arranged to turn in such direction as to cause simultaneous outward movement or simultaneous inward movement of said elongated members; a pair of electrical reversible motors each removably mounted on the distal end of a respective elongated member with its drive shaft projecting downwardly; a pair of rear view mirrors each mounted on the drive shaft of a respective one of said pair of motors whereby operation of said pair of motors causes said rear view mirrors to rotate about a vertical axis; spring pressed reel means mounted within said reel mounting element, a pair of electrical conductor cables wound on said reel and each leading to a respective one of said pair of electrical motors; the springs of said spring pressed reels yieldably urging said cables to a retracted position; and means within said truck for individually actuating said reversible electrical motors.

The full nature of the invention will be understood from the accompanying drawings and the following description and claims:

FIG. 1 is a front elevation of a truck having the rear view mirror arrangement of the present invention mounted thereon.

FIG. 2 is an enlarged fragmentary view of a portion of the structure illustrated in FIG. 1 and also showing certain portions broken away for illustrating the interior construction of the rear view mirror arrangement.

FIG. 3 is a composite view illustrating three alternative positions of certain apparatus forming a part of the structure of FIGS. 1 and 2.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawing, there is illustrated a truck 10 having the rear view mirror arrangement 11 of the present invention mounted thereon. The arrangement 11 includes a pair of tubular members 12 of rectangular cross section as illustrated in FIG. 3. The members 12 are fixed to the top of the cab 16 of the truck in laterally extending relation thereto by means of brackets 17. The members 12 are aligned in relation to one another and received therein is a pair of elongated members 20 also of rectangular cross section. The members 20 are each freely slidable longitudinally of the members 12 but are retained against rotation by reason of the rectangular cross section of the members 20 and 12.

Fixed to the upper surface of the members 12 is a reel mounting element or housing 25. The housing 25 along with the brackets 17 fixes the members 12 in aligned relation. Each of the elongated members 20 has a distal end portion 26 which is offset laterally and downwardly (as shown in FIG. 2) from the proximal portion 27 of the elongated members 20, the distal portion 26 and the proximal portion 27, being connected by portion 30. It will be evident from FIG. 3 that the members 20 can be removed from the members 12 and rotated 90 degrees or 180 degrees in the proper direction so that the distal ends 26 are thereby offset rearwardly, forwardly or upwardly instead of downwardly as shown in FIG. 2. This feature permits the rear view mirrors 31 to be adjusted according to the desires of the driver. For example, if the driver is relatively tall, he may desire the mirror to be positioned rearwardly because he will also locate his seat rearwardly. On the other hand, if the driver has short legs but is relatively tall, he may desire the mirror to be positioned upwardly while his seat is located in an intermediate front-to-rear position.

As illustrated in FIG. 3, the distal ends 26 of the members 20 are provided with a plurality of bores 32. The bores 32 receive bolts 35 for mounting a reversible electrical motor 36 by means of a bracket 37. The drive shaft 40 of the reversible electrical motor 36 mounts a respective one of the rear view mirrors 31. Of course, the bracket 37 can be removed and reused for mounting the motor with its shaft extending downwardly and the crooked portion 30 extending upwardly, rearwardly or forwardly.

A further reversible electrical motor 45 is fixedly mounted adjacent the inner ends 46 of the members 12 and has operatively connected to the drive shaft thereof a transmission 47. The transmission 47 might, for example, include a bevel gear arrangement whereby output power from the electrical motor 45 is transmitted into a pair of oppositely extending threaded shafts 50. Press fitted within the inner ends 55 of the members 20 are interiorly threaded blocks 56, each of which threadedly receives a respective one of the threaded shafts 50. The threads 57 of the shafts 50 turn in opposite directions whereby rotation of the shafts 50 by the motor 45 causes a simultaneous movement of the blocks 56 either away from the transmission 47 or toward the transmission 47. Since the blocks 56 are fixed to the members 20, operation of the motor 45 in one direction causes the rear view mirrors 31 on each side of the cab to move outwardly and operation of the motor 45 in the other direction causes both of the rear view mirrors 37 to simultaneously move inwardly.

Mounted within the housing 25 is a spring pressed reel 60. The reel 60 incorporates spring means normally functioning to maintain a tension on cables 61 and to wind the cables inwardly onto the reel 60 when the motors 36 are moved inwardly. Also mounted within the housing 25 are guide rollers 62. The cables 61 provide the power from the truck electrical system to the motors 36. The reels 60 and 62 function to keep the power cables 61 from becoming entangled with the structure when the mirrors 31 are adjusted outwardly or inwardly.

There is provided within the interior of the truck three switches, such as, for example, the switches used in operating power windows. The three switches (not shown) are positioned side by side and suitably marked to indicate which motor, 45 or 36, that they control. It can be appreciated that operation of these three switches will simultaneously move the two mirrors 31 either outwardly or inwardly and will rotate the angle of the respective mirrors 31 to adjust to the position to which the mirrors have been moved by the motor 45. It can be appreciated that the present invention provides an improved rear view mirror arrangement which makes possible easy and convenient adjustment of the rear view mirrors of a vehicle for various driving and parking situations.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention and the scope of the claims are also desired to be protected.

The invention claimed is:

1. A rear view mirror arrangement for a truck or the like comprising a pair of elongated members projecting laterally and oppositely of the truck; a reversible electrical motor; a pair of screws each threadedly received in a respective one of said elongated members; transmission means operatively connecting said reversible motor and said screws for simultaneous movement of said elongated members laterally of said truck; guide means for said elongated members; the threads of said screws being so arranged and the screws being arranged to turn in such direction as to cause simultaneous outward movement or simultaneous inward movement of said elongated members; a pair of electrical reversible motors each removably mounted on the distal end of a respective elongated member with its drive shaft projecting downwardly; a pair of rear view mirrors each mounted on the drive shaft of a respective one of said pair of motors whereby operation of said pair of motors causes said rear view mirrors to rotate about a vertical axis; and means within said truck for individually actuating said reversible electrical motors.

2. A rear view mirror arrangement for a truck or the like comprising a frame including oppositely projecting tubular portions and adapted to be fixed to the top of the truck in laterally extending relation thereto; a pair of elongated members with each of said elongated members being telescoped within a respective one of said tubular portions; said elongated members having distal ends projecting away from one another out of said tubular portions; a reversible electrical motor mounted on said frame; a pair of screws each threadedly received in a respective one of said elongated members; transmission means operatively connecting said reversible motor and said screws for simultaneous movement of said elongated members laterally of said truck; the threads of said screws being so arranged and the screws being arranged to turn in such direction as to cause simultaneous outward movement or simultaneous inward movement of said elongated members; a pair of electrical reversible motors each removably mounted on the distal end of a respective elongated member with its drive shaft projecting downwardly, a pair of rear view mirrors each mounted on the drive shaft of a respective one of said pair of motors whereby operation of said pair of motors causes said rear view mirrors to rotate about a vertical axis; and means within said truck for individually actuating said reversible electrical motors.

3. A rear view mirror arrangement for a truck or the like comprising a pair of tubular members adapted to be fixed to the top of the truck in laterally extending relation thereto; means for fixedly securing said rectangular tubular members in aligned relation; a pair of elongated members; each of said elongated members being telescoped within a respective one of said tubular members; said elongated members having distal ends projecting away from one another out of said tubular members; a reversible electrical motor fixed relative to said arrangement; a pair of screws each threadedly received in a respective one of said elongated members; transmission means operatively connecting said reversible motor and said screws for simultaneous movement of said elongated members laterally of said truck; the threads of said screws being so arranged and the screws being arranged to turn in such direction as to cause simultaneous outward movement or simultaneous inward movement of said elongated members; a pair of electrical reversible motors each removably mounted on the distal end of a respective elongated member with its drive shaft projecting downwardly; a pair of rear view mirrors each mounted on the drive shaft of a respective one of said pair of motors whereby operation of said pair of motors causes said rear view mirrors to rotate about a vertical axis; and means within said truck for individually actuating said reversible electrical motors.

4. A rear view mirror arrangement for a truck or the like comprising a pair of tubular members of rectangular cross section adapted to be fixed to the top of the truck in laterally extending relation thereto; means for fixedly securing said rectangular tubular members in aligned relation; a pair of elongated members of rectangular cross section; each of said elongated members being telescoped within a respective one of said tubular members; said elongated members having distal ends projecting away from one another out of said tubular members; said distal ends being offset laterally and downwardly from the proximal portion of said elongated members whereby said elongated members can be removed from said tubular members and reinserted therein with the distal ends offset rearwardly, forwardly or upwardly; a reversible electrical motor mounted on said reel mounting element; a pair of screws each threadedly received in a respective one of said elongated members; transmisison means operatively connecting said reversible motor and said screws for simultaneous movement of said elongated members laterally of said truck; the threads of said screws being so arranged and the screws being arranged to turn in such direction as to cause simultaneous outward movement or simultaneous inward movement of said elongated members; a pair of electrical reversible motors each removably mounted on the distal end of a respective elongated member with its drive shaft projecting downwardly; a pair of rear view mirrors each mounted on the drive shaft of a respective one of said pair of motors whereby operation of said pair of motors causes said rear view mirrors to rotate about a vertical axis; and means within said truck for individually actuating said reversible electrical motors.

5. A rear view mirror arrangement for a truck or the like comprising a pair of tubular members of rectangular cross section adapted to be fixed to the top of the truck in laterally extending relation thereto; a reel mounting element fixedly securing said rectangular tubular members in aligned relation; a pair of elongated members of rectangular cross section; each of said elongated members being telescoped within a respective one of said tubular members; said elongated members having distal ends projecting away from one another out of said tubular members; said distal ends being offset laterally and downwardly from the proximal portion of said elongated members whereby said elongated members can be removed from said tubular members and reinserted therein with the distal ends offset rearwardly, forwardly or upwardly; a reversible electrical motor mounted on said reel mounting element; a pair of screws each threadedly received in a respective one of said elongated members; transmission means operatively connecting said reversible motor and said screws for simultaneous movement of said elongated members laterally of said truck; the threads of said screws being so arranged and the screws being arranged to turn in such direction as to cause simultaneous outward movement or simultaneous inward movement of said elongated members; a pair of electrical reversible motors each removably mounted on the distal end of a respective elongated member with its drive shaft projecting downwardly; a pair of rear view mirrors each mounted on the drive shaft of a respective one of said pair of motors whereby operation of said pair of motors causes said rear view mirrors to rotate about a vertical axis; spring pressed reel means mounted within said reel mounting element, a pair of electrical conductor cables wound on said reel and each leading to a respective one of said pair of electrical motors; the springs of said spring pressed reels yieldably urging said cables to a retracted position; and means within said truck for individually actuating said reversible electrical motors.

References Cited

UNITED STATES PATENTS

| 2,241,866 | 5/1941 | Needham | 350—307 |
| 3,005,384 | 10/1961 | Baird et al. | 350—289 |

DAVID H. RUBIN, *Primary Examiner.*

W. L. BROWN, *Assistant Examiner.*